(12) United States Patent
Fotsch et al.

(10) Patent No.: US 6,788,782 B1
(45) Date of Patent: Sep. 7, 2004

(54) METHOD AND APPARATUS FOR SWITCHING BETWEEN MULTIPLE COMMUNICATION LINES

(75) Inventors: Don Fotsch, Winnetka, IL (US); Earl Turner, Crystal Lake, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/488,340

(22) Filed: Jan. 20, 2000

(51) Int. Cl.$^7$ ............................. H04M 3/00; H04M 7/00
(52) U.S. Cl. .................. 379/334; 379/207.02; 379/333; 379/335; 379/336
(58) Field of Search .......... 379/207.02, 207.04–207.07, 379/219, 220.01, 221.01–221.02, 317, 333–334, 335–337

(56) References Cited

U.S. PATENT DOCUMENTS

| | | |
|---|---|---|
| 3,410,961 A | 11/1968 | Slana |
| 3,504,127 A | 3/1970 | Slana |
| 4,055,729 A | 10/1977 | Vandling |
| 4,056,719 A | 11/1977 | Waaben |
| 4,282,604 A | 8/1981 | Jefferson |
| 5,125,027 A | 6/1992 | Blaszykowski et al. |
| 5,245,654 A | 9/1993 | Wilkison et al. |
| 5,481,606 A | 1/1996 | Andrieu et al. |
| 5,528,686 A | 6/1996 | Cwynar et al. |
| 5,717,752 A | 2/1998 | Whitney |
| 6,160,880 A | * 12/2000 | Allen |
| 6,535,595 B1 | * 3/2003 | Nakamura |

FOREIGN PATENT DOCUMENTS

| WO | WO94/06215 | 3/1994 |
|---|---|---|

OTHER PUBLICATIONS

3Com, "3Com Home Connect ADSL Modem Dual Link", www.3com, 1995–2001, pp. 1–3.

"Telephone Jacks", TechTarget.com, 2000–2001, pp. 1–6.

* cited by examiner

Primary Examiner—Duc Nguyen
(74) Attorney, Agent, or Firm—McDonnell Boehnen Hulbert & Berghoff LLP

(57) ABSTRACT

Disclosed is an apparatus and method for switching between two network lines, such as telephone subscriber lines. Households and offices are increasingly equipped with multiple network lines for voice and data communications. The line switching unit of the present invention has a first terminal for receiving a CPE line from a CPE device. First and second switches of the unit each connect a common terminal to a first switched terminal responsive to a first value of a control signal received at a control terminal of each switch and to a second switched terminal responsive to a second value of the control signal. The first switched terminal of the first switch is connected to the first terminal and the second switched terminal of the second switch is connected to the first terminal. The common terminal of the first switch is connected to a first network line and the common terminal of the second switch is connected to a second network line. A further aspect of the present invention includes a control unit that senses an off-hook signal on the CPE line and, when the control signal is in a state of outputting the first value, checks a state of the first network line to determine if it is in use. If the first network line is in use, then the control unit checks a state of the second network line. If the second network line is not in use, then the control unit changes the state of the control signal to output the second value of the control signal.

13 Claims, 3 Drawing Sheets

METHOD AND APPARATUS FOR SWITCHING BETWEEN MULTIPLE COMMUNICATION LINES

FIELD OF INVENTION

The present invention relates to communications and, more particularly, to communications involving multiple subscriber lines.

BACKGROUND OF THE INVENTION

The present invention is concerned with data and voice communications devices that share multiple telephone subscriber lines in an office or house. With the growth of data networks homes and offices are increasingly equipped with two or more telephone lines. Users will often have multiple data and voice devices connected to these lines. As a result, when one user attempts to access a telephone line through a communications device in order to make a phone call or establish a data connection, the user may find that the telephone line that the communications device is connected to is already in use by another user.

When the first line is in use, it is desirable to be able to change to the other telephone line in the home or office and attempt to place the call on that line. Often, changing line connections requires manual intervention to plug the communications device into a new line jack. Therefore, the need remains for a convenient way to switch between multiple communications lines.

SUMMARY OF THE INVENTION

In accordance with preferred embodiments of the present invention, some of the problems associated with switching between multiple communications lines in the prior art are overcome.

An embodiment of a line switching apparatus for switching between first and second network lines, according to the present invention, includes a first terminal for receiving a first CPE line, the first terminal having first and second nodes. The apparatus has a first switching device having a common terminal for receiving a first network line, first and second switched terminals, and a control terminal for receiving a control signal, where the first switching device is configured to electrically couple the common terminal to the first switched terminal responsive to a first value of the control signal and electrically couple the common terminal to the second switched terminal responsive to a second value of the control signal, where the first switched terminal of the first switching device is coupled to the first node of the first terminal. The apparatus also includes a second switching device having a common terminal for receiving a second network line, first and second switched terminals, and a control terminal for receiving the control signal, where the second switching device is configured to electrically couple the common terminal to the second switched terminal responsive to a first value of the control signal and electrically couple the common terminal to the second switched terminal responsive to a second value of the control signal, where the second switched terminal of the second switching device is coupled to the second node of the first terminal.

A further refinement of the embodiment of the apparatus according to the present invention includes a control unit. The control unit has a control output terminal for generating the control signal, a first CPE line input for receiving the first CPE line, a first network line input for receiving status information for the first network line and a second network line input for receiving status information for the second network line. The control unit is configured to store and output on the control output terminal one of the first and second values of the control signal. The control unit is further configured to receive a connection request signal over the first CPE line and, responsive thereto, check the status information for the first network line when the first value of the control signal is stored and output to determine whether the first network line is in use. When the first network line is in use, the control unit checks the status information for the second network line and, when the second network line is not in use, changes the control signal to the second value.

An embodiment of a method for switching between first and second network lines, according to the present invention, calls for coupling a first CPE line through a first switching device to the first network line and coupling the first CPE line through a second switching device to the second network line. The method also sets forth generating and storing a control signal, where the first CPE line is electrically connected to the first network line responsive to a first value of the control signal and the first CPE line is electrically isolated from the first network line responsive to a second value of the control signal, and where the first CPE line is electrically isolated from the second network line responsive to the first value of the control signal and electrically connected to the second network line responsive to the second value of the control signal.

A further refinement of the embodiment of the method according to the present invention sets forth receiving a connection request on the first CPE line. When the control signal has the first value, the method calls for checking whether the first network line is in use and, when the first network line is in use, switching the control signal to the second value. When the control signal has the second value, the method calls for checking whether the second network line is in use and, when the second network line is in use, switching the control signal to the first value.

The foregoing and other features and advantages of the present invention will be more readily apparent from the following detailed description of an embodiment of the present invention, which proceeds with references to the accompanying drawings.

DESCRIPTION OF THE DRAWINGS

Particular embodiments of the present invention are described below with reference to the following drawings, wherein.

Note that elements that are related to one another in the drawings are identified using the same or similar reference numbers.

DETAILED DESCRIPTION OF PREFERRED EMBODIMENTS

Figure 1:
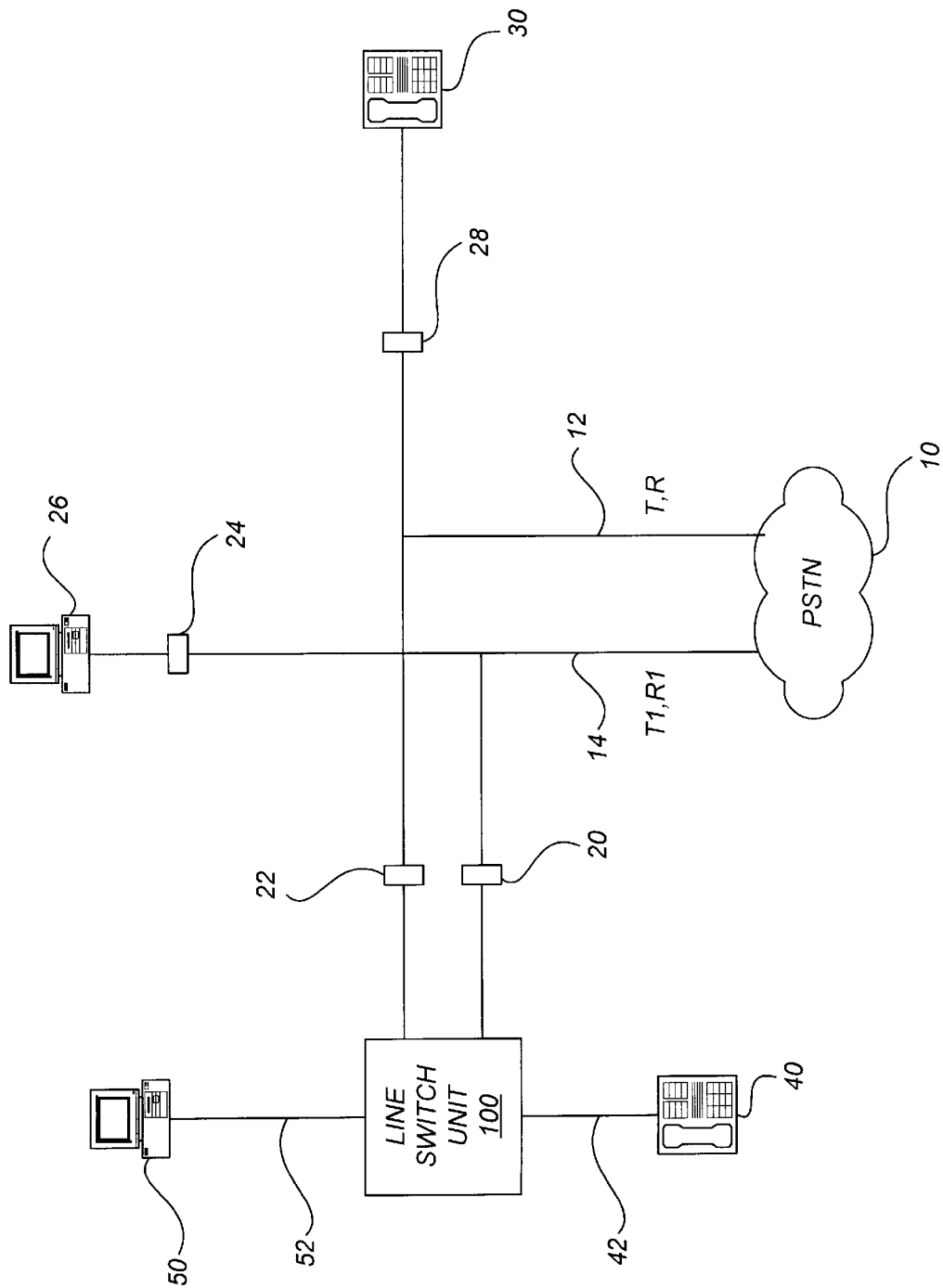
FIG. 1 is a functional block diagram illustrating an example of a conventional architecture illustrating an embodiment of a line switch unit according to the present invention connected to two shared communications lines.

The present invention is directed toward an apparatus and method for switching between multiple communications lines. FIG. 1 is a functional block diagram illustrating an exemplary architecture for the application of a line switch unit 100 according to the present invention in a multiple subscriber line home or office. The home or office is provided with two subscriber lines 12 and 14. Each line typically consists of a two-wire twisted pair where one wire is called a tip T and the other wire a ring R. The first twisted pair 12 is composed of a first tip T and a first ring R. The second twisted pair 14 is composed of second tip T1 and a second ring R1. The subscriber lines 12 and 14 connect to the public switched telephone network (PSTN) 10.

Twisted pair 12 is connected to terminals 22 and 28, which are sockets such as wall jacks. Line switch unit 100 is plugged into terminal 22 and a telephone 30 is plugged into terminal 28. Twisted pair 14 is connected to terminals 20 and 24, which are also sockets such as wall jacks. Line switch unit 100 is plugged into terminal 20 and a computer 26 is plugged into terminal 24.

Line switch unit 100 also services a two customer premises equipment (CPE) devices, which are telephone 40 and computer 50. User telephone 40 is connected to line switch unit 100 via customer premise equipment (CPE) line 42. Computer 50 is connected to line switch unit 100 via customer premise equipment (CPE) line 52.

When either computer 26 or telephone 30 has an active connection, then the respective subscriber line 12 or 14 will be unavailable for use by the CPE devices supported by line switch unit 100. When computer 26 or telephone 30 is actively communicating via PSTN 10, they will be off-hook and will draw current from their respective subscriber lines. Line switch unit 100 can sense that current is being drawn from the tip and ring pair of the subscriber line through its connections to terminals 20 and 22.

Figure 2:
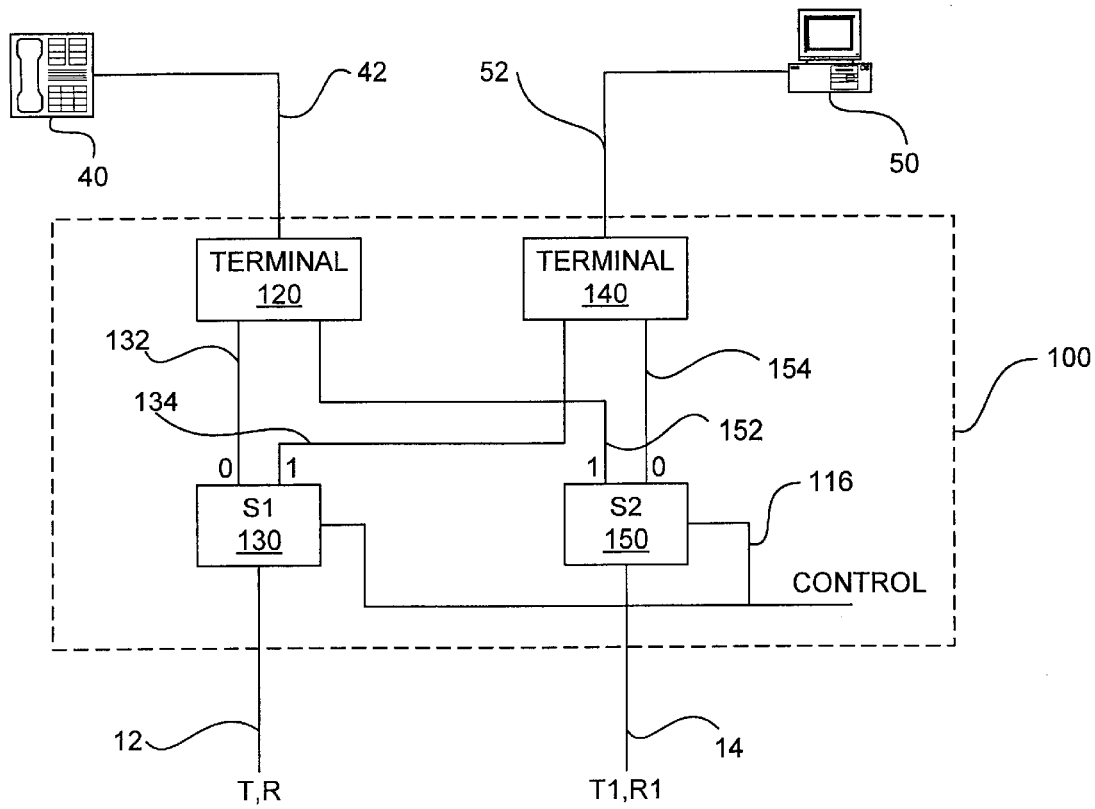
FIG. 2 is a functional block diagram illustrating an embodiment of the line switch unit according to the present invention shown in FIG. 1.

FIG. 2 is a functional block diagram illustrating an embodiment of line switch unit 100 of FIG. 1. Terminal 120 terminates CPE line 42 from telephone 40. Terminal 140 terminates CPE line 52 from computer 50. Each of terminals 120 and 140 has a pair of nodes that are coupled to a single output jack that receives the CPE line. Each of switches 130 and 150 has a common terminal that is coupled to a subscriber line pair 12 and 14, respectively, two switched terminals, and a control input, where a control signal 116 is received at the control terminal of each of the switches. One switched terminal is coupled to the common node when the control signal value is a logic 0 and the other switched terminal is coupled to the common node when the control signal is a logic 1. The logic 0 switched node of switch 130 is connected to a first node of terminal 120, while the logic 1 switched node of switch 130 is connected to a first node of terminal 140. Similarly, the logic 0 switched node of switch 150 is connected to a second node of terminal 140, while the logic 1 switched node of switch 150 is connected to a second node of terminal 120.

Figure 3:
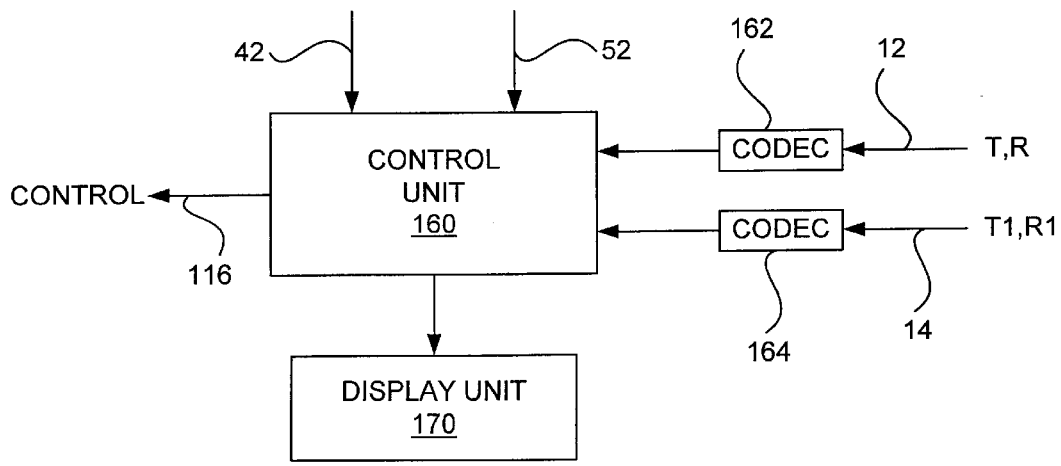
FIG. 3 is a functional block diagram illustrating an embodiment of a control unit for an the line switch unit shown in FIG. 2.

The control signal 116 can be generated using a pushbutton or similar manually activated device. However, in a preferred embodiment of the present invention, the line switch unit includes an automatic control device that generates control signal 116. FIG. 3 is a functional block diagram of a circuit that includes a control unit 160 for generating the control signal 116. Control unit 160 has a first CPE input terminal that is coupled to CPE line 42 and a second CPE input terminal that is coupled to CPE line 52. Control unit 160 also has first and second line sensing inputs coupled to output terminals of coder/decoders (codec) 162 and 164, respectively. Codec 162 has an input terminal that is coupled to subscriber line pair 12. Codec 164 has an input terminal that is coupled to subscriber line pair 14. Control unit 160 has a control output for generating the control signal 116. Control unit 160 also has a status output terminal for outputting status messages to a user of line switch unit 100 via a display unit 170.

Figure 4:
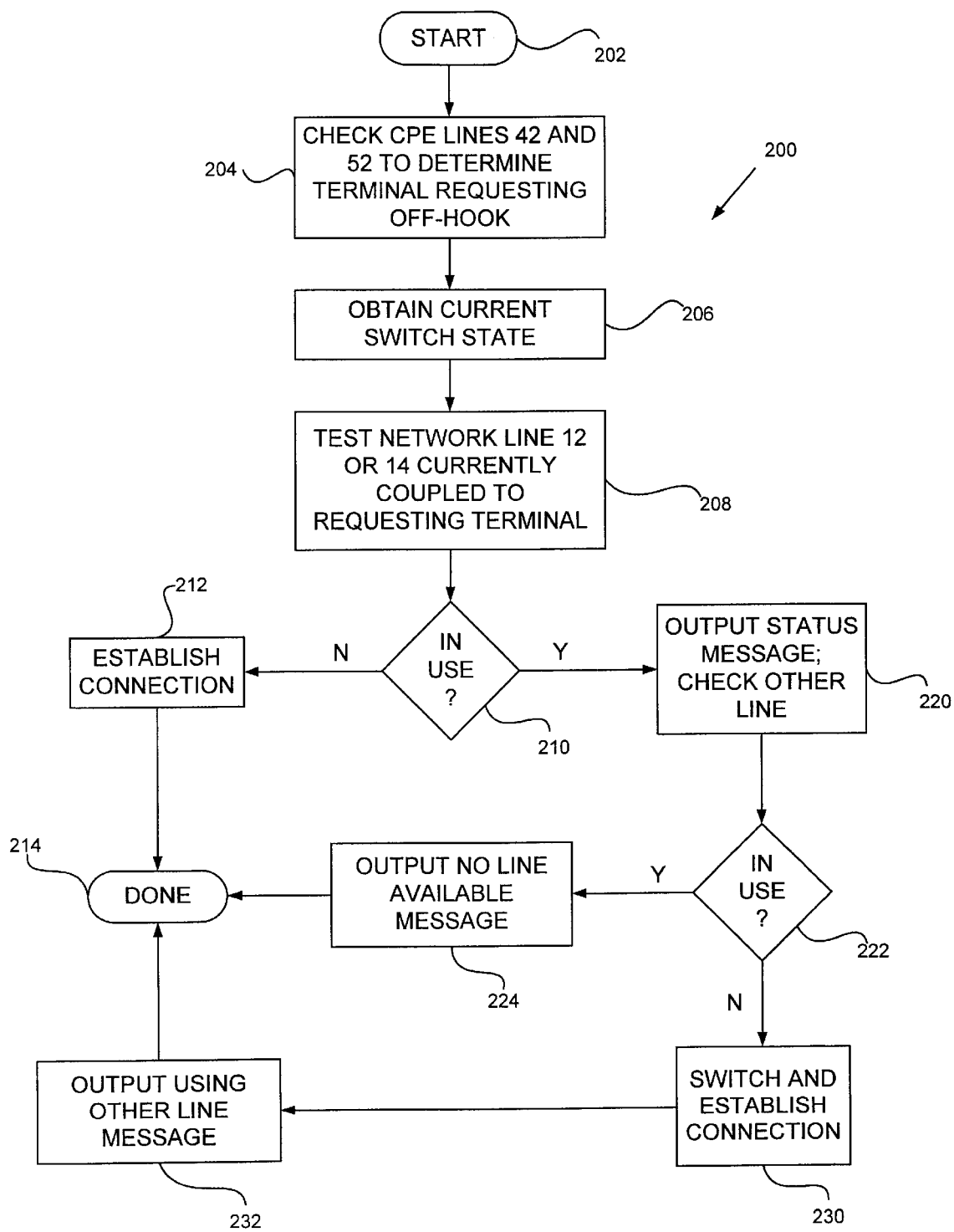
FIG. 4 is a control flow diagram illustrating an embodiment of a process performed by the control unit shown in FIG. 3.

FIG. 4 is a control flow diagram illustrating an embodiment of an automatic selection process 200 performed by the control unit 160 of FIG. 3. Control unit 160 enters process 200 at step 202 when a connection request, such as an off-hook signal, is received on one of CPE lines 42 and 52. At step 204, CPE lines 42 and 52 are checked to determine which line has initiated the connection request. At step 206, control unit 160 examines the status of the control signal 116 to determine the current state of switches 130 and 150. At step 208, control unit 160 examines the state of the output signal received from the appropriate one of codecs 162 and 164 to determine the status of the network line 12 or 14 that is currently coupled to the requesting terminal. For example, if the requesting CPE device is telephone 40, via CPE line 42, and the state of control signal 116 is logic 0, then control unit 160 will check the status of subscriber line pair 12 via codec 162. However, if the requesting CPE device is telephone 40 and the state of control signal 116 is logic 1, then control unit 160 will check the status of subscriber line pair 14 via codec 164. Similarly, if the requesting CPE device is computer 50, via CPE line 52, and the state of control signal 116 is logic 0, then control unit 160 will check the status of subscriber line pair 14 via codec 164. And, if the requesting CPE device is computer 50 and the state of control signal 116 is logic 1, then control unit 160 will check the status of subscriber line pair 12 via codec 162.

If the currently coupled network line 12 or 14 is not in use, then control branches at step 210 to step 212 where the control unit 160 establishes the connection. Establishing the connection can take the form of simply going off-hook on the currently coupled network line 12 or 14 or can include more sophisticated processing, such as dialing a number or transmitting an address for the user.

If the currently coupled network line 12 or 14 is in use, then control branches at step 210 to step 220. At step 220, control unit checks the status of the other line that is not currently coupled to the requesting CPE device. Control unit 160 checks the status of the other line by examining the output from whichever codec 162 or 164 is connected to the other line. Control unit 160 can also optionally output a status message to display unit 170 to notify the user that connected line is busy and the other line is being checked.

If the other line is in use, then control flow branches at step 222 to step 224 where control unit 160 optionally outputs another status message to display unit 170 notifying the user that no line is available to service the user's request. The process then terminates at step 214.

When the other line is available, i.e. not currently in use, then control flow branches at step 222 to step 230. At step 230, control unit 160 switches the value of the control signal 116 to connect the other line to the requesting CPE device and establishes a connection for the user in a manner similar to step 212. Control flow continues to step 232 where control unit 160 optionally outputs a status message to display unit 170 informing the user that the other line is being used to establish the connection. The process then terminates at step 214.

It should be noted that the line switch unit 100 shown in FIG. 1 can be integrated with one or the other of the CPE devices 40 and 50 shown in FIG. 1. For instance, line switch unit 100 can be integrated into computer 50 and be configured to switch between lines 12 and 14 in response to a connection attempt by computer 50.

In view of the wide variety of embodiments to which the principles of the invention can be applied, it should be understood that the illustrated embodiment is exemplary only, and should not be taken as limiting the scope of the present invention. For example, while the embodiment shown pertains to two CPE devices and two network lines, one of ordinary skill in the art will appreciate that the principles of the present invention can be extended to a system that can accommodate more than two CPE devices and more than two network lines. One of ordinary skill in art will further appreciate that while the embodiment shown uses switches, the switches may be implemented using relays, transistors or similar devices. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. A line switching apparatus for switching between first and second network lines, the apparatus comprising:

a first terminal for receiving a first CPE line, the first terminal having first and second nodes;

a first switching device having a common terminal for receiving a first network line, first and second switched terminals, and a control terminal for receiving a control signal, where the first switching device is configured to electrically couple the common terminal to the first switched terminal responsive to a first value of the control signal and electrically couple the common terminal to the second switched terminal responsive to a second value of the control signal, where the first switched terminal of the first switching device is coupled to the first node of the first terminal;

a second switching device having a common terminal for receiving a second network line, first and second switched terminals, and a control terminal for receiving the control signal, where the second switching device is configured to electrically couple the common terminal to the second switched terminal responsive to a first value of the control signal and electrically couple the common terminal to the second switched terminal responsive to a second value of the control signal, where the second switched terminal of the second switching device is coupled to the second node of the first terminal.

2. The apparatus of claim 1, the apparatus further including a control unit, the control unit having a control output terminal for generating the control signal, a first CPE line input for receiving the first CPE line, a first network line input for receiving status information for the first network line and a second network line input for receiving status information for the second network line, the control unit being configured to store and output on the control output terminal one of the first and second values of the control signal, and the control unit being further configured to receive a connection request signal over the first CPE line and, responsive thereto, check the status information for the first network line when the first value of the control signal is stored and output to determine whether the first network line is in use and, when the first network line is in use, check the status information for the second network line and, when the second network line is not in use, change the control signal to the second value.

3. The apparatus of claim 2, the apparatus further including a display unit having an input terminal and being configured to display a message responsive to a message signal, and where the control unit further includes a message output terminal for outputting the message signal, the message output terminal being coupled to the input terminal of the display unit.

4. The apparatus of claim 2, the apparatus further including:

a first codec having an input terminal coupled to the first network line and an output terminal coupled to the first network line input of the control unit; and a second codec having an input terminal coupled to the second network line and an output terminal coupled to the second network line input of the control unit.

5. The apparatus of claim 1, wherein the apparatus is further configured to be a functional unit integrated into a CPE device coupled to the first CPE line.

6. The apparatus of claim 1, the apparatus further including a second terminal for receiving a second CPE line, the second terminal having first and second nodes, the first node of the second terminal being coupled to the second switched terminal of the first switching device and the second node of the second terminal being coupled to the first switched terminal of the second switching device.

7. The apparatus of claim 6, the apparatus further including a control unit, the control unit having a control output terminal for generating the control signal, a first CPE line input for receiving the first CPE line, a second CPE line input for receiving the second CPE line, a first network line input for receiving status information for the first network line and a second network line input for receiving status information for the second network line, the control unit being configured to:

store and output on the control output terminal one of the first and second values of the control signal;

receive a connection request signal over the first CPE line and, responsive thereto, check the status information for the first network line when the first value of the control signal is stored and output to determine whether the first network line is in use and, when the first network line is in use, check the status information for the second network line and, when the second network line is not in use, change the control signal to the second value; and receive a connection request signal over the second CPE line and, responsive thereto, check the status information for the second network line when the first value of the control signal is stored and output to determine whether the second network line is in use and, when the second network line is in use, check the status information for the first network line and, when the first network line is not in use, change the control signal to the second value.

8. A method for switching between first and second network lines simultaneously providing service to a customer premises, the method comprising the steps of:

coupling a first CPE line through a first switching device to the first network line;

coupling the first CPE line through a second switching device to the second network line;

generating and storing a control signal, where the first CPE line is electrically connected to the first network line responsive to a first value of the control signal and the first CPE line is electrically isolated from the first network line responsive to a second value of the control signal, and where the first CPE line is electrically isolated from the second network line responsive to the first value of the control signal and electrically connected to the second network line responsive to the second value of the control signal;

coupling a second CPE line through the first switching device to the first network line, where the second CPE line is electrically connected to the first network line responsive to the second value of the control signal and electrically isolated from the first network line responsive to the first value of the control signal; and coupling the second CPE line through a second switching device to the second networks line, where the second CPE line is electrically connected to the second network line responsive to the first value of the control signal and electrically isolated from the second network line responsive to the second value of the control signal.

9. The method of claim 8, further including the steps of:

receiving a connection request on the first CPE line;

when the control signal has the first value, checking whether the first network line is in use and, when the first network line is in use, switching the control signal to the second value;

when the control signal has the second value, checking whether the second network line is in use and, when the second network line is in use, switching the control signal to the first value.

10. The method of claim 9, further including the step of outputting a message to a display indicating that the first network line is in use when switching the control signal to the second value.

11. The method of claim 10, further including the step of outputting a second message to a display indicating that the second network line is in use when switching the control signal to the first value.

12. The method of claim 8, the method further including the steps of:

receiving a connection request on the second CPE line;

when the control signal has the first value, checking whether the second network line is in use and, when the second network line is in use, switching the control signal to the first value;

when the control signal has the second value, checking whether the first network line is in use and, when the first network line is in use, switching the control signal to the second value.

13. The method of claim 12, the method further including the step of outputting a message to a display indicating that the second network line is in use when switching the control signal to the second value.

* * * * *